United States Patent
Cai et al.

(10) Patent No.: US 10,268,899 B2
(45) Date of Patent: Apr. 23, 2019

(54) REAL-TIME INDOOR PARKING ADVISOR

(71) Applicant: International Business Machines Corporation, Armonk, NY (US)

(72) Inventors: Keke Cai, Beijing (CN); Xin Chang, Beijing (CN); Yue Chen, Beijing (CN); Zhong Su, Beijing (CN); Guoyu Tang, Beijing (CN); Enliang Xu, Beijing (CN); Li Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 14/927,706

(22) Filed: Oct. 30, 2015

(65) Prior Publication Data

US 2017/0124874 A1    May 4, 2017

(51) Int. Cl.
| | | |
|---|---|---|
| *H04N 7/18* | (2006.01) | |
| *G06K 9/00* | (2006.01) | |
| *G08G 1/01* | (2006.01) | |
| *G08G 1/017* | (2006.01) | |
| *G08G 1/04* | (2006.01) | |
| *G08G 1/14* | (2006.01) | |

(52) U.S. Cl.
CPC ....... *G06K 9/00771* (2013.01); *G08G 1/0112* (2013.01); *G08G 1/0116* (2013.01); *G08G 1/0129* (2013.01); *G08G 1/0175* (2013.01); *G08G 1/04* (2013.01); *G08G 1/144* (2013.01); *G08G 1/146* (2013.01)

(58) Field of Classification Search
CPC ......................................................... G08G 1/41
USPC ......................................................... 348/149
See application file for complete search history.

(56) References Cited

U.S. PATENT DOCUMENTS

| | | | |
|---|---|---|---|
| 7,123,166 B1 * | 10/2006 | Haynes .................... | G08G 1/14 340/932.2 |
| 7,135,991 B2 | 11/2006 | Slemmer et al. | |
| 8,896,485 B2 | 11/2014 | Mendelson | |
| 9,581,997 B1 * | 2/2017 | Penilla ................. | G05D 1/0011 |
| 9,892,639 B2 * | 2/2018 | Ullrich .................. | G08G 1/065 |
| 2004/0233036 A1 * | 11/2004 | Sefton ................... | G07B 15/04 340/5.53 |
| 2010/0052946 A1 * | 3/2010 | Levine ................... | G08G 1/143 340/932.2 |
| 2011/0133957 A1 * | 6/2011 | Harbach ................. | G08G 1/14 340/932.2 |
| 2012/0058775 A1 * | 3/2012 | Dupray ................. | G01S 5/0257 455/456.1 |
| 2012/0130872 A1 * | 5/2012 | Baughman ............. | G07B 15/02 705/32 |

(Continued)

*Primary Examiner* — Leron Beck
(74) *Attorney, Agent, or Firm* — Christopher K. McLane; Daniel R. Simek (57) ABSTRACT

In an approach for determining an available parking space, a computer accesses a streaming video. The computer identifies a vehicle and a corresponding identification characteristic within the accessed streaming video. The computer retrieves historical data associated with the identified identification characteristic, wherein the historical data includes previous parking locations. The computer determines a preferred parking space within the retrieved historical data associated with the identified identification characteristic. The computer determines whether the identified preferred parking space is available based on a parking database.

20 Claims, 3 Drawing Sheets

(56) References Cited

U.S. PATENT DOCUMENTS

| | | | |
|---|---|---|---|
| 2012/0265434 A1* | 10/2012 | Woodard | G08G 1/144 |
| | | | 701/423 |
| 2013/0039532 A1* | 2/2013 | Carbonell | G06K 9/00785 |
| | | | 382/103 |
| 2014/0077973 A1 | 3/2014 | Lai et al. | |
| 2014/0309924 A1 | 10/2014 | Varoglu et al. | |
| 2015/0123818 A1 | 5/2015 | Sellschopp | |
| 2015/0279213 A1* | 10/2015 | Balter | G08G 1/144 |
| | | | 705/13 |

* cited by examiner

REAL-TIME INDOOR PARKING ADVISOR

BACKGROUND

The present invention relates generally to the field of navigation, and more particularly to navigating to an available parking location.

In countries where personally owned and operated vehicles are the dominant mode of transportation, parking lots are a common feature within cities and suburban areas. Shopping malls, sports stadiums, and similar venues often feature parking lots of an immense area that is dedicated solely to the parking of vehicles. Parking facilities include indoor and outdoor private property belonging to a house, the side of the road (e.g., metered or laid out parking spaces), parking lots, indoor and outdoor multi-level structures (e.g., parking structures, parking garages, parking ramps, etc.), shared underground parking facilities, and facilities for particular modes of vehicles (e.g., cycle parking).

Video surveillance, also known as closed-circuit television (CCTV), utilizes video cameras to monitor behaviors, activities, or other changing information within a location (e.g., house, business, parking garage, etc.). Video cameras include digital video recorders that record the video in a digital format or analog video recorders that record the video as an analog signal. Within a video surveillance system, the video surveillance cameras transmit the video via a signal to a specific place (e.g., video monitor, recording equipment). The video may be viewed in real-time and/or stored for future analysis and review.

SUMMARY

Aspects of the present invention disclose a method, computer program product, and system for determining an available parking space. The method includes one or more computer processors accessing a streaming video. The method further includes one or more computer processors identifying a vehicle and a corresponding identification characteristic within the accessed streaming video. The method further includes one or more computer processors retrieving historical data associated with the identified identification characteristic, wherein the historical data includes previous parking locations. The method further includes one or more computer processors determining a preferred parking space within the retrieved historical data associated with the identified identification characteristic. The method further includes one or more computer processors determining whether the identified preferred parking space is available based on a parking database.

DETAILED DESCRIPTION

Within an urban area, urban planners consider whether and/or how to accommodate or "demand manage" potentially large numbers of vehicles in small geographic areas. While parking lots and parking garages aid in the creation of parking spaces in a small area (e.g., multi-level parking garage), as recognized by embodiments of the present invention, the demand for parking spaces may be greater than the number of parking spaces allotted. Embodiments of the present invention also recognize the availability of parking spaces within a parking facility (e.g., parking garage, parking lot, parking ramp, etc.) are in a constant state of flux due to the number vehicles entering and leaving at any given time. Embodiments of the present invention track available parking spaces within a parking facility and provide navigational information to a driver of a vehicle to an available parking space in real-time. Additionally, embodiments of the present invention select an available parking space with respect to preferences associated with the vehicle.

Figure 1:
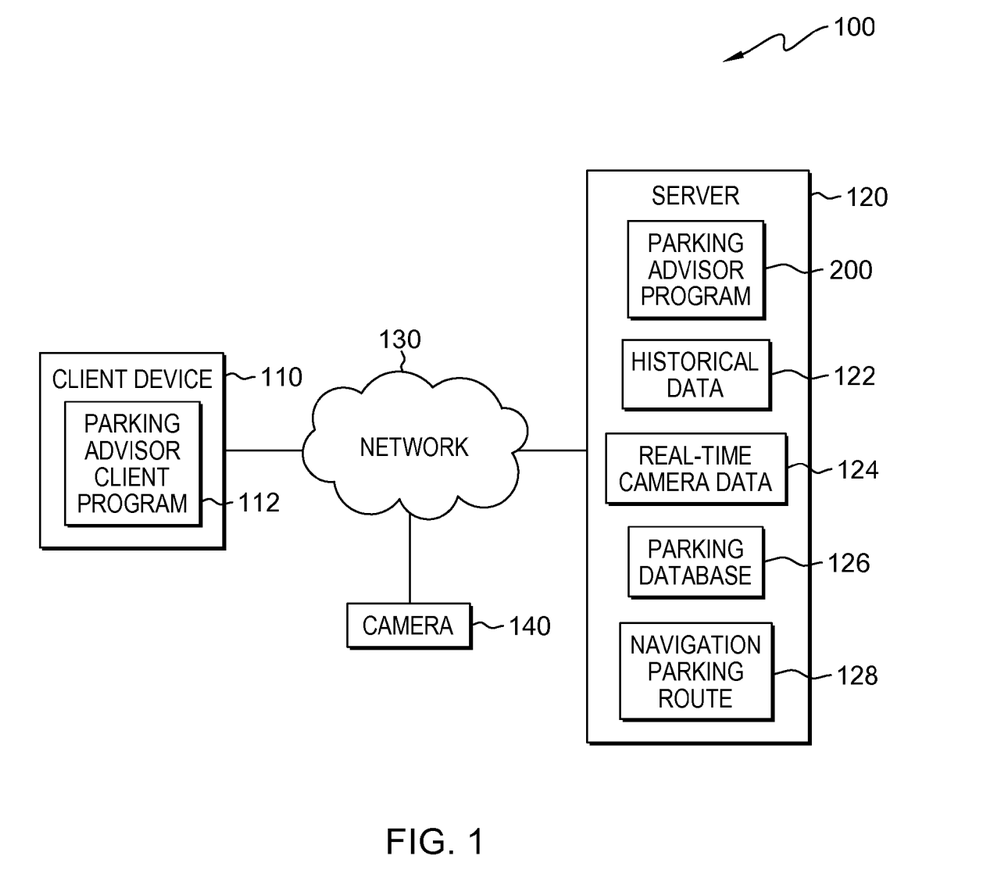
FIG. 1 is a functional block diagram illustrating a parking guidance environment, in accordance with an embodiment of the present invention.

The present invention will now be described in detail with reference to the Figures. FIG. 1 is a functional block diagram illustrating a parking guidance environment, generally designated 100, in accordance with one embodiment of the present invention. FIG. 1 provides only an illustration of one embodiment and does not imply any limitations with regard to the environments in which different embodiments may be implemented.

In the depicted embodiment, parking guidance environment 100 includes client device 110, server 120, and camera 140, all interconnected over network 130. Parking guidance environment 100 may include additional computing devices, mobile computing devices, servers, computers, storage devices, or other devices not shown.

Client device 110 may be an electronic device or computing system capable of processing program instructions and receiving and sending data. In some embodiments, client device 110 may be a laptop computer, a tablet computer, a netbook computer, a personal computer (PC), a personal digital assistant (PDA), a smart phone, or any programmable electronic device capable of communicating with network 130. In other embodiments, client device 110 may represent a server computing system utilizing multiple computers as a server system, such as in a cloud-computing environment. In the depicted embodiment, client device 110 is associated with a vehicle attempting to locate a parking space within parking guidance environment 100. The number of client devices are not limited to client device 110, additional client devices may exist or be added that are not currently shown in FIG. 1. Client device 110 contains parking advisor client program 112.

Parking advisor client program 112 is a set of one of more programs designed to carry out the operations for a specific application to assist a user to perform an activity (e.g., navigate to a parking space within a parking garage). In the depicted embodiment, parking advisor client program 112 resides on client device 110. In another embodiment, parking advisor client program 112 may reside on server 120 or on another device (not shown) connected over network 130. Parking advisor client program 112 sends and receives information from parking advisor program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud-computing environment. In general, server 120 is representative of any electronic device or combination of electronic devices capable of executing machine readable program instructions as described in greater detail with regard to FIG. 3, in accordance with embodiments of the present invention. Server 120 contains historical data 122, real-time camera data 124, parking database 126, navigation parking route 128, and parking advisor program 200.

Historical data 122 is an ongoing collection of parking information relative to individual vehicles and/or drivers that is extracted from real-time camera data 124. Historical data 122 includes information pertaining to times of day, days of the week, average time spent in a parking space, etc. Parking advisor program 200 utilizes historical data 122 as a basis for forecasting future data and trend (e.g., parking behaviors, parking preferences) with respect to an individual vehicle upon returning to a parking facility. For example, a driver of a vehicle parks repeatedly in the same parking space next to a walkway, thus exhibiting a trend (e.g., parking behavior, parking preference etc.) for selecting parking spaces located next to a walkway. In the depicted embodiment, historical data 122 resides on server 120. In another embodiment, historical data 122 may reside on a computing device, another server or on another device (not shown) provided historical data 122 is accessible by parking advisor program 200.

Real-time camera data 124 is live streaming video footage from camera 140. Real-time camera data 124 can include multiple video feeds (e.g., one from each instance of camera 140). Live streaming video is multimedia that is constantly received by and presented to an end-user, while being delivered by a provider (e.g., network 130) in real-time. Real-time is a method where events are portrayed at the same time at which the events occur rather than after a delay at a later point in time. Upon analysis by parking advisor program 200, real-time camera data 124 provides information that parking advisor program 200 utilizes to update historical data 122, parking database 126, and navigation parking route 128. In the depicted embodiment, real-time camera data 124 resides on server 120. In another embodiment, real-time camera data 124 resides on camera 140. In some other embodiment, real-time camera data 124 resides on a computing device, another server, another camera, or on another device (not shown) provided real-time camera data 124 is accessible by parking advisor program 200.

Parking database 126 includes information regarding a layout and conditions of the area associated with a parking garage and/or parking lot. For example, parking database 126 includes: speed limits, distances to structures and features of the parking facility, location of driving lanes, total number of parking spaces with location and type (e.g., handicapped, permit, reserved, all access, vehicle size type, etc.), number of levels, stairs, elevators, exits, entrances, etc. Additionally, parking database 126 includes information pertaining to the utilization of the individual parking spaces within the parking facility (e.g., most used, least used, ranked order of selection, percentage of time occupied, time empty, etc.). In the depicted embodiment, parking database 126 resides on server 120. In another embodiment, parking database 126 resides on a computing device, another server, or another device (not shown) provided parking database 126 is accessible by parking advisor program 200.

Navigation parking route 128 includes driving directions, visual aids (e.g., maps), and time estimates from the location associated with a vehicle and an available parking space. Navigation parking route 128 is the output of parking advisor program 200. Navigation parking route 128 updates in real-time based on changes parking advisor program 200 identifies within real-time camera data 124. In the depicted embodiment, navigation parking route 128 resides on server 120. In another embodiment, navigation parking route 128 resides on client device 110. In some other embodiment, navigation parking route 128 resides on another client device, server, computing device, or another device (not shown) provided navigation parking route 128 is accessible by parking advisor client program 112 and parking advisor program 200.

Network 130 may be a local area network (LAN), a wide area network (WAN) such as the Internet, a wireless local area network (WLAN), any combination thereof, or any combination of connections and protocols that will support communications between client device 110, server 120, camera 140, and other computing devices and servers (not shown), in accordance with embodiments of the invention. Network 130 may include wired, wireless, or fiber optic connections.

Camera 140 is a video camera (e.g., surveillance camera, pan-tilt-zoom camera, digital camera, etc.) used for electronic motion picture acquisition. Pan-tilt-zoom cameras are capable of remote directional and zoom control. Additionally, pan-tilt-zoom cameras may include an auto tracking capability which aids in the estimation of size of a vehicle and distance between camera 140 and a moving vehicle and provides additional information for analysis. Camera 140 captures and sends real-time camera data 124 to a screen for viewing and/or to parking advisor program 200 for utilization in real-time (e.g., live). The number of cameras are not limited to a single instance of camera 140, additional cameras may exist or be added that are not currently shown in FIG. 1. For example, within a parking facility, multiple instances of camera 140 exist that provide coverage of the entire area associated with the parking facility.

Parking advisor program 200 is a program for identifying available parking spaces within a parking facility and creating navigation parking route 128 to direct client device 110 to a preferred parking space. Parking advisor program 200 combines information from historical data 122, real-time camera data 124, and parking database 126 to create navigation parking route 128 that is tailored to an individual vehicle and driver preference. Parking advisor program 200 updates navigation parking route 128 in real-time as changes occur within real-time camera data 124. In the depicted embodiment, parking advisor program 200 resides on server 120. In another embodiment, parking advisor program 200 resides on client device 110. In some other embodiment, parking advisor program 200 resides on another client device, server, or device (not shown) provided parking advisor program 200 can access historical data 122, real-time camera data 124, parking database 126, and parking advisor client program 112.

Figure 2:
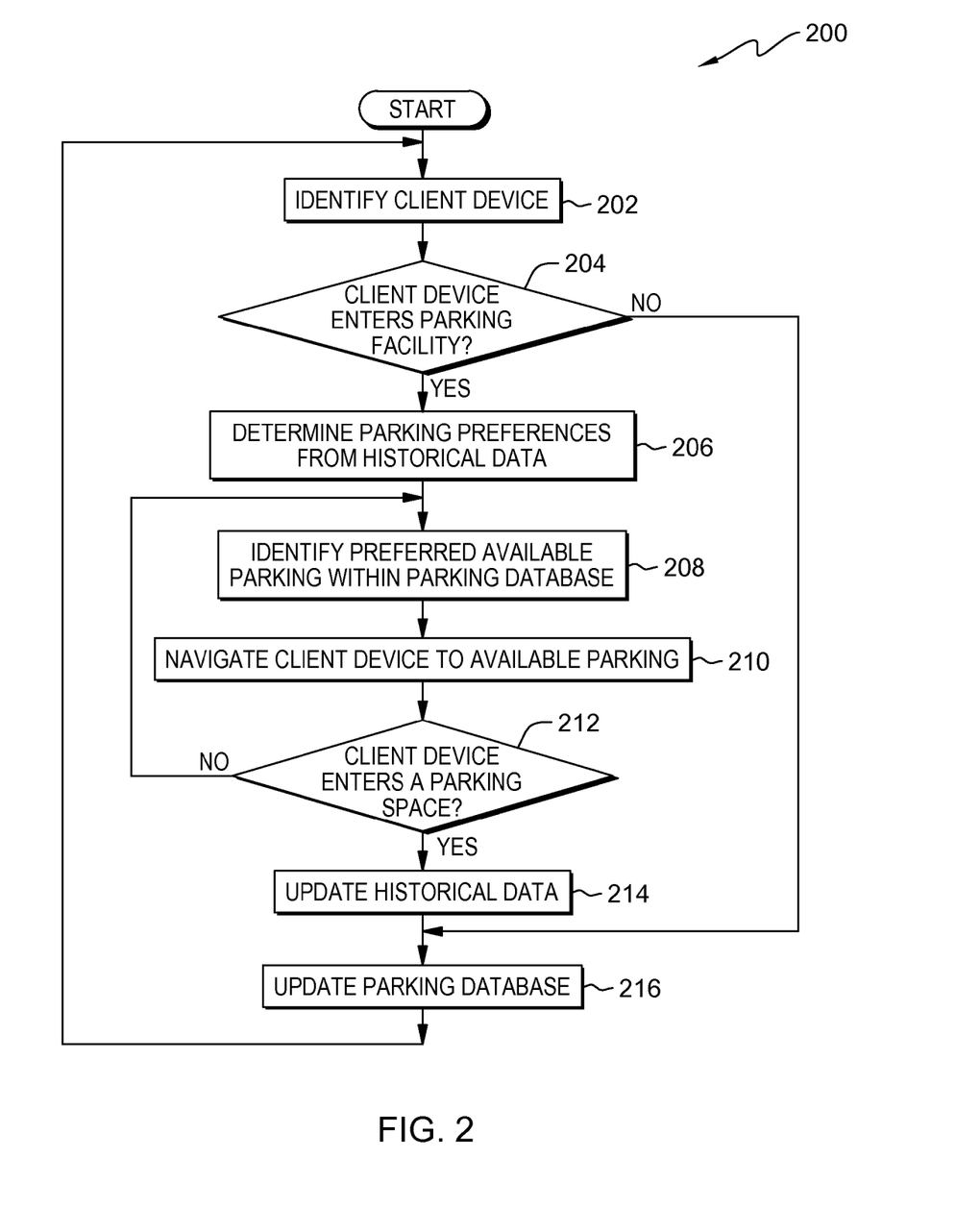
FIG. 2 is a flowchart depicting operational steps of a parking advisor program, on a server computer within the parking guidance environment of FIG. 1, for identifying a preferred available parking space and providing corresponding navigation instructions, in accordance with an embodiment of the present invention.

FIG. 2 is a flowchart depicting operational steps of parking advisor program 200, a program for identifying a preferred available parking space and providing corresponding navigation instructions, in accordance with an embodiment of the present invention. In the depicted embodiment, throughout the operational steps, parking advisor program 200 receives a continuous video feed (e.g., live streaming video) through real-time camera data 124. At any time throughout the operational steps, parking advisor program 200 is capable of initiating additional iterations of parking advisor program 200 and incorporating changes to existing iterations as updates occur in real-time. Parking advisor program 200 initiates in a monitoring state and waits to identify client device 110 (step 202) prior to continuing.

In step 202, parking advisor program 200 identifies client device 110. In one embodiment, parking advisor program 200 detects movement within real-time camera data 124. Parking advisor program 200 utilizes image recognition technology (e.g., image recognition software) to identify the source of the movement (e.g., person, motorized vehicles, client device 110, etc.). Image recognition technology identifies objects within an image by applying image processing techniques (e.g., noise removal and feature extraction to locate lines, textures, etc.) and interprets the remaining shapes as single objects. Parking advisor program 200 compares the remaining objects with a repository of known shapes and identifies vehicles (e.g., client device 110) for further processing. In another embodiment, parking advisor program 200 can disregard movement associated with non-vehicles, such as people, as the movement does not directly relate to available parking spaces.

In another embodiment, parking advisor program 200 identifies client device 110 with assistance from parking facility sensors. For example, when entering or leaving a parking facility, a vehicle passes through a gated entry. A driver associated with client device 110 presses a button, swipes an identification card (e.g., badge) or selects a method of payment. Parking advisor program 200 receives an indication of the driver action and accesses real-time camera data 124 associated with the location of the driver action. Parking advisor program 200 correlates the driver action with a vehicle entering or exiting the parking garage, and identifies client device 110.

Parking advisor program 200 locates an identification characteristic (e.g., license plate, identification card, etc.) associated with client device 110. A license plate is a sign affixed to a vehicle displaying a unique series of letters and/or numbers issued by a government to identify a registered vehicle. Parking advisor program 200 isolates the location of the license plate within real-time camera data 124 and extracts the license plate number. Parking advisor program 200 stores the license plate number for further identification associated with future movements of client device 110 within the parking facility. In another embodiment, when a driver swipes an identification card (e.g., badge, parking card, etc.), parking advisor program 200 stores the unique identification card information in association with the license plate number for further identification and cross referencing associated with multiple instances of client device 110. For example, a driver may have more than one vehicle but utilizes the same identification card for entry and exit from a parking garage. By cross referencing the identification card, parking advisor program 200 identifies driver preferences independent of the license plate number.

In decision 204, parking advisor program 200 determines whether client device 110 enters the parking facility. In one embodiment, parking advisor program 200 interprets movements associated with client device 110 within real-time camera data 124 and determines client device 110 enters the parking facility. For example, an instance of client device 110 entering the parking facility follows an upward path as indicated in the parking facility leading to potential parking, and parking advisor program 200 determines the instance of client device 110 entering the parking facility. However, an instance of client device 110 exiting the parking facility follows a downward path, as indicated in the parking facility, leading to an exit, and parking advisor program 200 determines the instance of client device 110 exiting the parking facility. In another example, parking advisor program 200 determines movement associated with client device 110 (e.g., vehicle backs up or pulls out) from a filled parking space (e.g., client device 110 was stationary for a period of time) and determines client device 110 is exiting the parking facility.

In another embodiment, parking advisor program 200 determines whether client device 110 enters the parking facility based on sensor data at a gated entry and/or exit. For example, at the gated entry, a driver presses a button to dispense a parking ticket, and parking advisor program 200 determines client device 110 enters the parking facility. Conversely, at the gated entry, a user inserts a ticket and/or payment, and parking advisor program 200 determines client device 110 exits the parking facility.

In another embodiment, parking advisor program 200 determines whether client device 110 enters the parking facility by comparing the identification characteristic (e.g., license plate number, identification card) associated with client device 110 with stored license plate numbers of currently parked instances of client device 110 (e.g., additional vehicles stored with corresponding identification characteristics) within parking database 126. For example, parking advisor program 200 does not locate the current license plate number within parking database 126 and determines client device 110 enters the parking facility and/or searches for parking. In another example, parking advisor program 200 does locate the current license plate number within parking database 126 and determines client device 110 was previously parked and is exiting the parking facility.

In some other embodiment, parking advisor program 200 compares the time of entry associated with a client device 110 with the current time to determine whether client device 110 enters the parking facility. Parking advisor program 200 records a time of entry associated with client device 110 (e.g., a time stamp from real-time camera data 124, an internal clock reading associated with a gated entry). Parking advisor program 200 compares the time of entry with a threshold (e.g., maximum time to reach an available parking space). Parking advisor program 200 determines client device 110 enters a parking facility when the difference between the time of entry and the current time is less than or equal to the threshold. Parking advisor program 200 determines client device 110 leaves a parking facility when the difference between the time of entry and the current time is greater than the threshold. For example, the time of entry for client device 110 is 12:05 pm, the current time is 12:07 pm, and the estimated time to reach the furthest available parking space is six minutes. Parking advisor program 200 determines the time difference to be two minutes, which is under the six-minute threshold; therefore, parking advisor program 200 determines client device 110 enters the parking facility. Conversely, the entry time is again 12:05 pm, but the current time is 1:35 pm. Parking advisor program 200 determines the time difference to be 90 minutes, which exceeds the six-minute threshold; therefore, parking advisor program 200 determines client device 110 leaves the parking facility.

If parking advisor program 200 determines client device 110 enters the parking facility (decision 204, yes branch), then parking advisor program 200 determines parking preferences from historical data 122 (step 206). If parking advisor program 200 determines client device 110 is not entering the parking facility (decision 204, no branch), then parking advisor program 200 updates parking database 126 (step 216).

In step 206, parking advisor program 200 determines parking preferences from historical data 122. Parking advisor program 200 searches historical data 122 for the identification characteristic (e.g., license plate number and/or identification card information) associated with client device 110. In one embodiment, parking advisor program 200 identifies license plate number and/or identification card information within historical data 122 and collects the associated parking space information as the data set for further analysis. For example, a driver working in the city parks a vehicle within a parking garage Monday through Friday for a year. Historical data 122 includes approximately two hundred and fifty entries that parking advisor program 200 retrieves and can utilize to determine a parking preference (e.g., parking behavior).

In another embodiment, parking advisor program 200 does not identify the license plate number and/or identification card information within historical data 122 (e.g., first time). Parking advisor program 200 collects the parking space information associated with all instances of parking within the parking facility as the data set for further analysis (e.g., no longer specifies a specific instance of client device 110). For example, a vehicle enters a parking garage that parking advisor program 200 does not locate within historical data 122. As parking advisor program 200 was unable to locate parking space information associated with the license plate number and/or identification card information associated with the vehicle within historical data 122, parking advisor program 200 retrieves all parking space entry information associated with all license plate numbers and/or identification cards within historical data 122. Parking advisor program 200 analyzes historical data 122 based on all of the entries to determine parking spaces with the highest occupancies. In some other embodiment, parking advisor program 200 determines historical data 122 does not include enough parking space information associated with client device 110 to determine a parking preference, and also determines parking preferences based on the entirety of historical data 122. For example, parking advisor program 200 locates two different parking space entries associated with a license plate number. Due to the limited amount of data, parking advisor program 200 determines a preference cannot be identified and retrieves the entirety of historical data 122 and determines parking preferences.

Parking advisor program 200 identifies trends of parking behavior (e.g., statistical trends, percentages, groupings, day of the week, time of day, etc.) within historical data 122 with respect to each of the parking spaces. In one embodiment, parking advisor program 200 individually ranks the parking spaces based on occupancy (e.g., specific to an individual instance of client device 110, entirety of historical data 122). For example, within historical data 122, twenty entries exist for client device 110. Within the twenty entries, ten of the entries associate client device 110 with a parking space next to a set of stairs, five of the entries associate client device 110 with a parking space next to an elevator, and the remaining five entries associate client device 110 with various spaces between the set of stairs and the elevator. Parking advisor program 200 determines that fifty percent of the instances within historical data 122 associate client device 110 with a parking space next to the set of stairs, twenty-five percent with a parking space next to the elevator, and the remaining twenty-five percent is split across varying parking spaces. Parking advisor program 200 ranks the parking spaces with the highest occupancy as the most preferred, and the lowest occupancy parking spaces as least preferred. Therefore, parking advisor program 200 determines the preferred parking space, based on the parking behavior associated with client device 110, is next to the set of stairs.

In another embodiment, parking advisor program 200 groups and ranks the parking spaces by occupancy and location (e.g., next to the stairs, next to the elevator, level, etc.) with respect to an individual instance of client device 110 or the entirety of historical data 122. For example, parking spaces nearest the stairs regardless of level are the most frequently occupied by vehicles, whereas the parking spaces in the middle of a row are the least frequently occupied by vehicles. Therefore, parking advisor program 200 ranks parking spaces nearest the stairwell as the most preferred. In another embodiment, parking advisor program 200 ranks the parking spaces based on time of day (e.g., morning, afternoon, night) and/or time of week (e.g., weekday, weekend, workday, holiday, etc.). For example, the number of occupied parking spaces is higher during business hours on a workday than the same hours on the weekend. Therefore, parking advisor program 200 ranks the parking spaces differently due to changes in availability that occur based on time and/or date (e.g., all parking spaces and/or parking identified with an instance of client device 110). For example, during the week a vehicle parks in the middle of a row, but the same vehicle on the weekend parks next to the set of stairs. Parking advisor program 200, therefore, selects parking for the vehicle in the middle of a row Monday through Friday but selects parking near the set of stairs on Saturday and Sunday.

In step 208, parking advisor program 200 identifies preferred available parking within parking database 126. Parking advisor program 200 identifies available parking spaces (e.g., empty parking spaces, status is set to available) within parking database 126. Parking advisor program 200 organizes the available parking spaces based on the ranking from step 206. Parking advisor program 200 selects the highest ranked available parking space as the preferred available parking space. Upon selection and assignment of a preferred available parking space to client device 110, parking advisor program 200 removes the parking space from the available parking spaces (e.g., does not allow the same parking space to be assigned to another vehicle). For example, parking advisor program 200 identifies three available parking spaces: one on the second level in the center of a row, a second on the third level by the elevators, and a third on the fourth level by a set of stairs. Within the ranking, parking advisor program 200 identifies parking spaces near the set of stairs as the highest rank, followed by parking spaces near the elevator, and then parking spaces within a row. Therefore, parking advisor program 200 identifies the parking space on the fourth level by the set of stairs as the preferred available parking space based on the ranking and assigns the parking space to client device 110.

In some other embodiment, parking advisor program 200 provides more than one preferred available parking space to the driver through parking advisor client program 112 for selection. Parking advisor program 200 receives the selection from parking advisor client program 112. Parking advisor program 200 assigns the driver selection as the preferred available parking space. Parking advisor program 200 updates parking database 126 and subsequent preferred parking space assignments accordingly. For example, parking advisor program 200 provides a first vehicle with three options in a ranked order (e.g., highest to lowest), fourth level by the set of stairs, third level by the elevator, and second level in the middle of a row. The driver of the first vehicle selects the parking space on the second level. Parking advisor program 200 removes the parking space on the second level from the available parking spaces and provides a second vehicle with the remaining options on the third and fourth levels.

In another embodiment, parking advisor program 200 identifies preferred available parking spaces for multiple instances of client device 110. In one embodiment, parking advisor program 200 implements a "first in" priority scheme (e.g., queue) to select preferred available parking spaces for multiple instances of client device 110. For example, two vehicles enter a parking facility with the same preferences. Parking advisor program 200 selects the parking space on the fourth level by the set of stairs for the first vehicle. Parking advisor program 200 assigns the second vehicle the next available preferred parking space, the parking space on the third level by the elevator. In another embodiment, parking advisor program 200 implements a first available priority scheme and selects the first available preferred parking space. In some other embodiment, parking advisor program 200 implements the first available priority scheme without user preferences. For example, none of the preferred parking spaces are available; therefore, parking advisor program 200 selects the next available parking location regardless of location.

Parking advisor program 200 receives live streaming updates through real-time camera data 124 and tracks multiple instances of client device 110. Parking advisor program 200 analyzes real-time camera data 124 for changes (e.g., vehicle parks in an available parking space, vehicle leaves an occupied space, etc.). Parking advisor program 200 updates the available parking spaces within parking database 126 as changes occur. Parking advisor program 200 evaluates assigned preferred parking spaces associated with client device 110 with the updates to parking database 126 with respect to preferences. In one embodiment, parking advisor program 200 determines a change to the preferred parking space assigned to client device 110 and assigns a new preferred parking space to client device 110 (e.g., higher ranked parking space becomes available, assigned parking space changes to unavailable). In another embodiment, parking advisor program 200 determines the currently assigned parking space remains the best match with respect to preferences and maintains the assignment.

For example, parking advisor program 200 determines the first vehicle parks within a preferred parking space that parking advisor program 200 assigned to the second vehicle. The first vehicle, while driving to the assigned preferred parking space on the fourth level, instead parks on the third level by the elevator. Parking advisor program 200 identifies the change in availability and reassigns the second vehicle to park within the available preferred parking space on the fourth level by the set of stairs.

In another example, parking advisor program 200 determines a third vehicle leaves an available preferred parking space on the second level next to the set of stairs, and parking advisor program 200 reassesses current assignments. Parking advisor program 200 updates parking database 126 with the new available preferred parking space. Parking advisor program 200 reviews the location and preferences of the two vehicles that are not currently parked. Parking advisor program 200 determines the first vehicle is on the third level and, therefore, past the new available parking space. However, parking advisor program 200 determines the second vehicle is on the first level and reassigns the available preferred parking space from the third floor by the elevator to the second level by the set of stairs. Parking advisor program 200 returns the deselected parking space to an available parking space status within parking database 126.

In step 210, parking advisor program 200 navigates client device 110 to the available preferred parking space. Parking advisor program 200 selects the preferred parking space as the destination and the current location of client device 110 as the starting location. Parking advisor program 200 determines driving directions based on the starting location (e.g., current location associated with client device 110) and a destination (e.g., preferred available parking space). In one embodiment, parking advisor program 200 provides a set of instructions (e.g., visual, audio, etc.) to client device 110 through parking advisor client program 112. Parking advisor program 200 provides the travel time, distance, and directions to the selected available preferred parking space. In another embodiment, parking advisor program 200 provides direction through signs within the parking facility. For example, a series of lights and arrows are illuminated within the parking facility that a driver views and follows to an assigned preferred parking space. Parking advisor program 200 updates the travel time, distance, and direction to the selected available preferred parking space as client device 110 moves through the parking facility. Additionally, parking advisor program 200 incorporates updates to the instructions as parking advisor program 200 identifies changes within real-time camera data 124 (e.g., changes to available preferred parking, updates assigned preferred parking space, changes in speeds, etc.).

In decision 212, parking advisor program 200 determines whether client device 110 enters a parking space. Parking advisor program 200 tracks client device 110 within real-time camera data 124. Parking advisor program 200 determines a location of client device 110. Parking advisor program 200 compares the location of client device 110 with the location of the selected available parking space and/or additional available parking spaces. Parking advisor program 200 determines client device 110 enters a parking space when the location of client device 110 and the selected available parking space and/or additional available parking spaces match. Parking advisor program 200 determines client device 110 is not parked when the location of client device 110 and the selected available parking space and/or additional available parking spaces do not match (e.g., client device 110 is within a driving lane).

If parking advisor program 200 determines client device 110 enters a parking space (decision 212, yes branch), then parking advisor program 200 updates historical data 122 (step 214). If parking advisor program 200 determines client device 110 does not enter a parking space (decision 212, no branch), then parking advisor program 200 identifies preferred available parking within parking database 126 (step 208).

In step 214, parking advisor program 200 updates historical data 122. In one embodiment, parking advisor program 200 accesses historical data 122 with respect to the license plate number and/or identification card information associated with client device 110. Parking advisor program 200 appends existing instances of historical data 122 with the information associated with the location of the selected parking space. In another embodiment, parking advisor program 200 creates a new entry within historical data 122 with respect to a new license plate number and/or identification card (e.g., license plate number and/or identification card was not found). Parking advisor program 200 stores the location of the parking space within the newly created entry within historical data 122.

In step 216, parking advisor program 200 updates parking database 126. In one embodiment, parking advisor program 200 changes the status of a parking space to be available (e.g., client device 110 leaves the parking facility and/or a parking space). In another embodiment, parking advisor program 200 changes the status of a parking space to be occupied (e.g., client device 110 parks within a parking space). Upon completion, parking advisor program 200 identifies a new instance of client device 110 (step 202).

Figure 3:
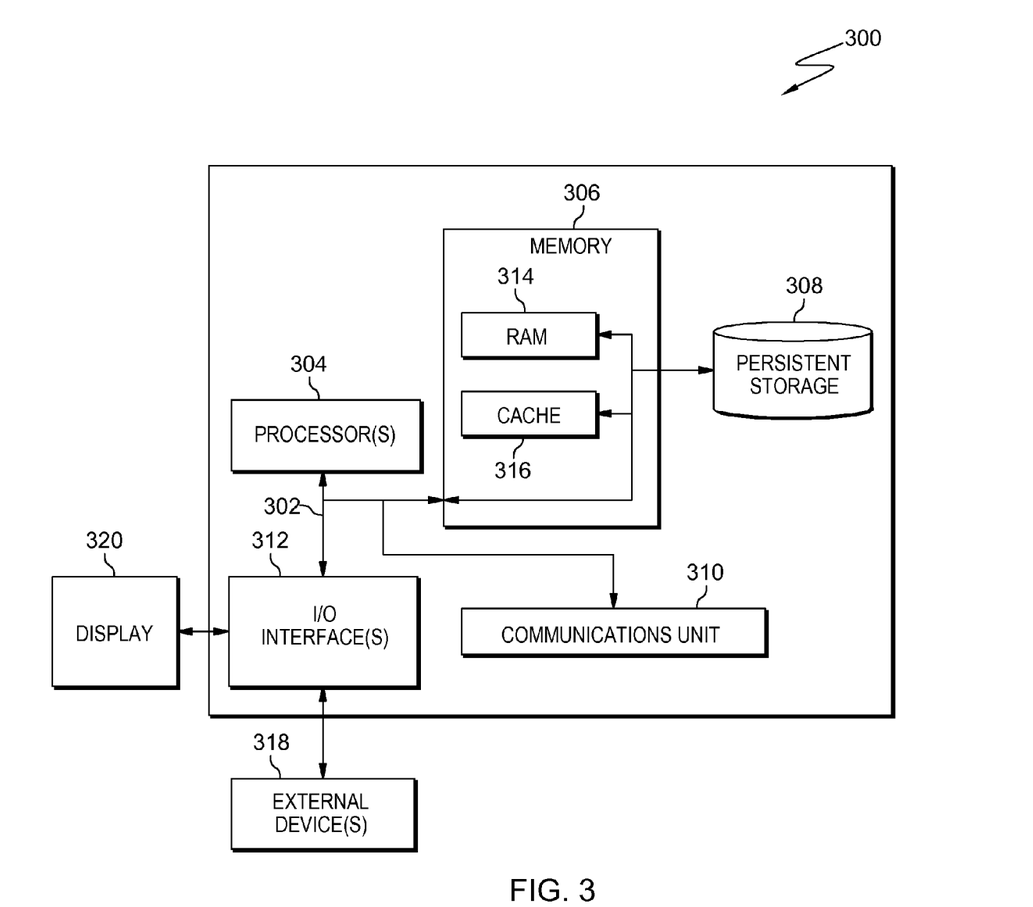
FIG. 3 is a block diagram of components of the server computer executing the parking advisor program, in accordance with an embodiment of the present invention.

FIG. 3 depicts a block diagram of components of server computer 300, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

Parking advisor client program 112, historical data 122, real-time camera data 124, parking database 126, navigation parking route 128, and parking advisor program 200 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Parking advisor client program 112, historical data 122, real-time camera data 124, parking database 126, navigation parking route 128, and parking advisor program 200 may be downloaded to persistent storage 308 through communications unit 310.

I/O interface(s) 312 allows for input and output of data with other devices that may be connected to server computer 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., parking advisor client program 112, historical data 122, real-time camera data 124, parking database 126, navigation parking route 128, and parking advisor program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining an available parking space, the method comprising:

accessing, by one or more computer processors, a real-time streaming video associated with a parking facility;

identifying, by one or more computer processors, a characteristic of an identified vehicle within the accessed real-time streaming video and a user of the identified vehicle;

retrieving, by one or more computer processors, historical data associated with the identified characteristic of the identified vehicle, wherein the historical data includes previous parking locations for the identified vehicle within the parking facility and previous parking locations for the identified user of the identified vehicle;

identifying, by one or more computer processors, trends of parking behavior within the retrieved historical data associated with the identified characteristic of the identified vehicle and the identified user of the identified vehicle, wherein the trends of parking behavior are determined statistical trends and percentages with respect to each parking space within the retrieved historical data that matches the identified characteristic of the identified vehicle and the identified user of the identified vehicle;

ranking, by one or more computer processors, the identified trends of parking behavior;

determining, by one or more computer processors, a preferred parking space based on the ranked trends of parking behavior, wherein the preferred parking space is a parking space with a highest historical occupancy occurrence and a location for the identified vehicle and the identified user of the identified vehicle, wherein the location identifies a recurring feature associated with the location of the preferred parking space within the parking facility; and determining, by one or more computer processors, whether the determined preferred parking space is available based on a parking database.

2. The method of claim 1, wherein identifying characteristic of the identified vehicle within the accessed real-time streaming video further comprises:

identifying, by one or more computer processor, movement within the accessed real-time streaming video;

identifying, by one or more computer processors, an object within the identified movement;

applying, by one or more computer processors, image recognition software to the identified object; and determining, by one or more computer processors, that the identified object is a vehicle based on the applied image recognition software.

3. The method of claim 1, wherein determining a preferred parking space based on the identified trends of parking behavior further comprises:

ranking, by one or more computer processors, the identified trends of parking behavior;

identifying, by one or more computer processors, one or more available parking spaces within the parking database;

and identifying, by one or more computer processors, the preferred parking space based on a highest ranked available parking space within the ranked one or more available parking spaces.

4. The method of claim 1, wherein determining whether the determined preferred parking space is available based on the parking database further comprises:

retrieving, by one or more computer processors, a status associated with the determined preferred parking space within the parking database; and determining, by one or more computer processors, whether the retrieved status associated with the determined preferred parking space is available.

5. The method of claim 1, further comprising:

responsive to determining that the determined preferred parking space is available, selecting, by one or more computer processors, the preferred parking space as a destination;

determining, by one or more computer processors, directions from a current location of the identified vehicle to the selected preferred parking space;

providing, by one or more computer processors, the determined directions to the selected preferred parking space to the identified vehicle; and determining, by one or more computer processors, whether the identified vehicle is parked.

6. The method of claim 5, further comprising:

responsive to determining the identified vehicle is parked, determining, by one or more computer processors, a location associated with the identified vehicle within the parking database;

updating, by one or more computer processor, the historical data with the determined location associated with the identified vehicle; and updating, by one or more computer processors, the parking database to change a status of the determined location associated with the identified vehicle from available to unavailable.

7. The method of claim 5, further comprising:

responsive to determining the identified vehicle is not parked, determining, by one or more computer processors, changes within the parking database with respect to availability;

determining, by one or more computer processors, an updated preferred parking space based on the determined changes within the parking database;

selecting, by one or more computer processors, the updated preferred parking space as a destination based on the determined updated preferred parking space;

determining, by one or more computer processors, directions from a current location of the identified vehicle to the selected updated preferred parking space;

providing, by one or more computer processors, the determined directions to the selected updated preferred parking space to the identified vehicle; and determining, by one or more computer processors, whether the identified vehicle is parked.

8. A computer program product for determining an available parking space, the computer program product comprising:

one or more computer readable storage devices having program instructions therewith, the program instructions executable by a computer to cause the computer to:

access a real-time streaming video associated with a parking facility;

identify a characteristic of an identified vehicle within the accessed real-time streaming video and a user of the identified vehicle;

retrieve historical data associated with the identified characteristic of the identified vehicle, wherein the historical data includes previous parking locations for the identified vehicle within the parking facility and the identified user of the identified vehicle;

identify trends of parking behavior within the retrieved historical data associated with the identified characteristic of the identified vehicle and the identified user of the identified vehicle, wherein the trends of parking behavior are determined statistical trends and percentages with respect to each parking space within the retrieved historical data that matches the identified characteristic of the identified vehicle and the identified user of the identified vehicle;

rank the identified trends of parking behavior;

determine a preferred parking space based on the ranked trends of parking behavior, wherein the preferred parking space is a parking space with a highest historical occupancy occurrence and a location for the identified vehicle and the identified user of the identified vehicle, wherein the location identifies a recurring feature associated with the location of the preferred parking space within the parking facility; and determine whether the determined preferred parking space is available based on a parking database.

9. The computer program product of claim 8, wherein to identify characteristic of the identified vehicle within the accessed real-time streaming video further comprises one or more of the following program instructions, stored on the one or more computer readable storage devices, to:

identify movement within the accessed real-time streaming video;

identify an object within the identified movement;

apply image recognition software to the identified object; and determine that the identified object is a vehicle based on the applied image recognition software.

10. The computer program product of claim 8, wherein to determine a preferred parking space based on the identified trends of parking behavior further comprises program instructions, stored on the one or more computer readable storage devices, to:
- identify one or more available parking spaces within the parking database;
- rank the identified one or more available parking spaces based on the ranked trends of parking behavior; and
- identify the preferred parking space based on a highest ranked available parking space within the ranked one or more available parking spaces.

11. The computer program product of claim 8, wherein to determine whether the determined preferred parking space is available based on the parking database further comprises one or more of the following program instructions, stored on the one or more computer readable storage devices, to:
- retrieve a status associated with the determined preferred parking space within the parking database; and
- determine whether the retrieved status associated with the determined preferred parking space is available.

12. The computer program product of claim 8, further comprising one or more of the following program instructions, stored on the one or more computer readable storage devices, to:
- responsive to determining that the identified preferred parking space is available, selecting, by one or more computer processors, the preferred parking space as a destination;
- determine directions from a current location of the identified vehicle to the selected preferred parking space;
- provide the determined directions to the selected preferred parking space to the identified vehicle; and
- determine whether the identified vehicle is parked.

13. The computer program product of claim 12, further comprising one or more of the following program instructions, stored on the one or more computer readable storage devices, to:
- responsive to determining the identified vehicle is parked, determine a location associated with the identified vehicle within the parking database;
- update the historical data with the determined location associated with the identified vehicle; and
- update the parking database to change a status of the determined location associated with the identified vehicle from available to unavailable.

14. The computer program product of claim 12, further comprising one or more of the following program instructions, stored on the one or more computer readable storage devices, to:
- responsive to determining the identified vehicle is not parked, determine changes within the parking database with respect to availability;
- determine an updated preferred parking space based on the determined changes within the parking database;
- select the updated preferred parking space as a destination based on the determined updated preferred parking space;
- determine directions from a current location of the identified vehicle to the selected updated preferred parking space;
- provide the determined directions to the selected updated preferred parking space to the identified vehicle; and
- determine whether the identified vehicle is parked.

15. A computer system for determining an available parking space, the computer system comprising:
one or more computer processors, one or more computer readable storage devices, and program instructions stored on the computer readable storage devices for execution by at least one of the one or more processors, the program instructions comprising:
- program instructions to access a real-time streaming video associated with a parking facility;
- program instructions to identify a characteristic of an identified vehicle within the accessed real-time streaming video and a user of the identified vehicle;
- program instructions to retrieve historical data associated with the identified characteristic of the identified vehicle, wherein the historical data includes previous parking locations for the identified vehicle within the parking facility and the identified user of the identified vehicle;
- program instructions to identify trends of parking behavior within the retrieved historical data associated with the identified characteristic of the identified vehicle and the identified user of the identified vehicle, wherein the trends of parking behavior are determined statistical trends and percentages with respect to each parking space within the retrieved historical data that matches the identified characteristic of the identified vehicle and the identified user of the identified vehicle;
- program instructions to rank the identified trends of parking behavior;
- program instructions to determine a preferred parking space based on the ranked trends of parking behavior, wherein the preferred parking space is a parking space with a highest historical occupancy occurrence and a location for the identified vehicle and the identified user of the identified vehicle, wherein the location identifies a recurring feature associated with the location of the preferred parking space within the parking facility; and
- program instructions to determine whether the determined preferred parking space is available based on a parking database.

16. The computer system of claim 15, wherein to identify characteristic of the identified vehicle within the accessed real-time streaming video further comprises one or more of the following program instructions, stored on the one or more computer readable storage devices, to:
- identify movement within the accessed real-time streaming video;
- identify an object within the identified movement;
- apply image recognition software to the identified object; and
- determine that the identified object is a vehicle based on the applied image recognition software.

17. The computer system of claim 15, wherein to determine a preferred parking space based on the identified trends of parking behavior further comprises program instructions, stored on the one or more computer readable storage devices, to:
- rank the identified trends of parking behavior;
- identify one or more available parking spaces within the parking database;
- rank the identified one or more available parking spaces based on the ranked trends of parking behavior; and
- identify the preferred parking space based on a highest ranked available parking space within the ranked one or more available parking spaces.

18. The computer system of claim 15, wherein to determine whether the identified preferred parking space is available based on the parking database further comprises one or more of the following program instructions, stored on the one or more computer readable storage devices, to:

retrieve a status associated with the determined preferred parking space within the parking database; and determine whether the retrieved status associated with the determined preferred parking space is available.

19. The computer system of claim 15, further comprising one or more of the following program instructions, stored on the one or more computer readable storage devices, to:

responsive to determining that the identified preferred parking space is available, selecting, by one or more computer processors, the preferred parking space as a destination;

determine directions from a current location of the identified vehicle to the selected preferred parking space;

provide the determined directions to the selected preferred parking space to the identified vehicle; and determine whether the identified vehicle is parked.

20. The computer system of claim 19, further comprising one or more of the following program instructions, stored on the one or more computer readable storage devices, to:

responsive to determining the identified vehicle is parked, determine a location associated with the identified vehicle within the parking database;

update the historical data with the determined location associated with the identified vehicle; and update the parking database to change a status of the determined location associated with the identified vehicle from available to unavailable.

* * * * *